H. BERNHARDT.
REFRIGERATOR SCALE.
APPLICATION FILED OCT. 3, 1919.
1,357,683.
Patented Nov. 2, 1920.
2 SHEETS—SHEET 1.
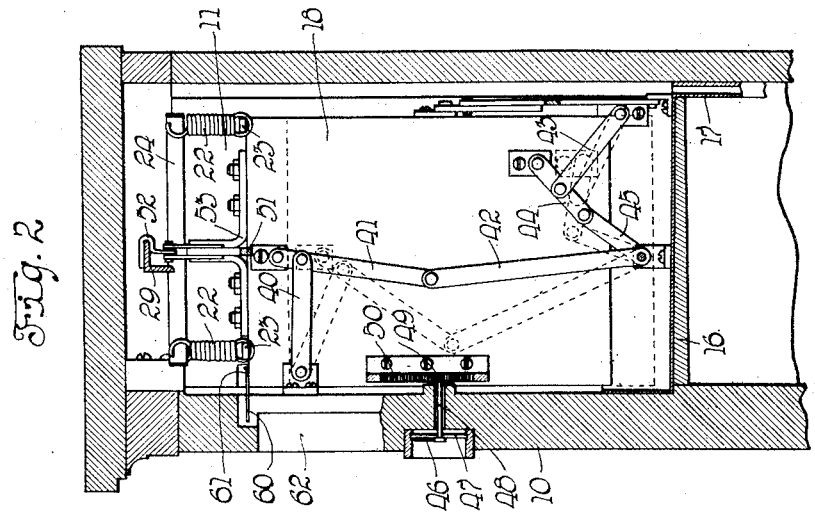
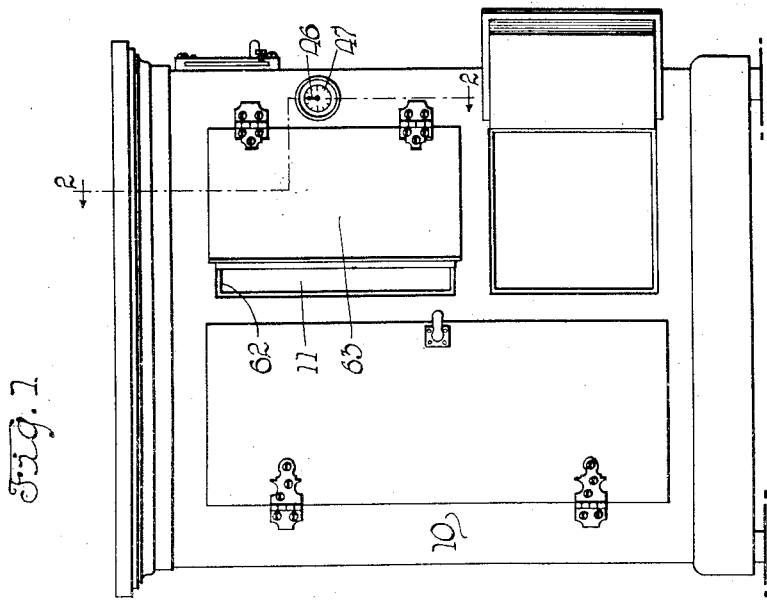
Inventor
Hans Bernhardt
By Braun Boettcher & Dieus
Attorneys H. BERNHARDT.
REFRIGERATOR SCALE.
APPLICATION FILED OCT. 3, 1919.
1,357,683.
Patented Nov. 2, 1920.
2 SHEETS—SHEET 2.
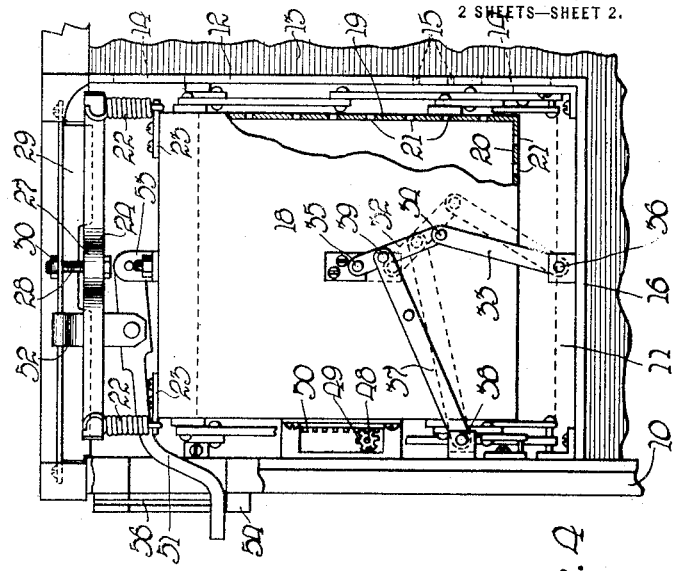
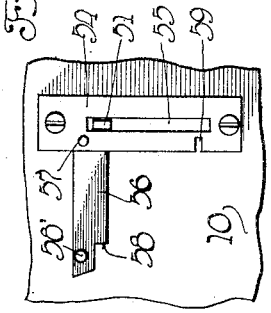
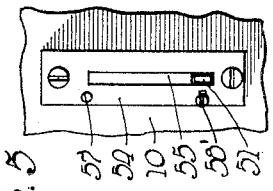
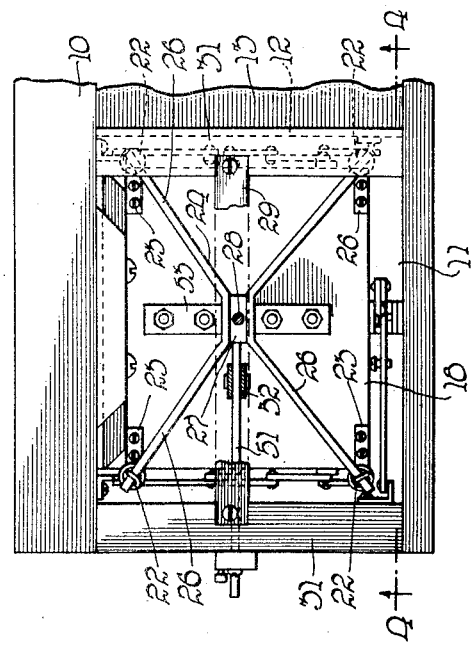
Inventor
Hans Bernhardt
By Brown Boettcher & Dienner
Attorneys

UNITED STATES PATENT OFFICE.

HANS BERNHARDT, OF MILWAUKEE, WISCONSIN.

REFRIGERATOR-SCALE.

1,357,683.  Specification of Letters Patent.  Patented Nov. 2, 1920.

Application filed October 3, 1919. Serial No. 328,248.

*To all whom it may concern:*

Be it known that I, HANS BERNHARDT, formerly a subject of the former Emperor of Germany, having made application for my second papers for citizenship in the United States, residing at Milwaukee, in the county of Milwaukee and State of Wisconsin, have invented a certain new and useful Improvement in Refrigerator-Scales, of which the following is a full, clear, concise, and exact description, reference being had to the accompanying drawings, forming a part of this specification.

This invention relates to refrigerators and more particularly to an ice measuring and indicating device for use therewith.

In households as well as in stores and other establishments where ice is used for storage purposes there has been a long felt need for a simple device for ascertaining the amount of ice contained in the storage receptacle without requiring its removal therefrom. For instance, under ordinary conditions the purchaser of ice does not know whether the amount of ice delivered corresponds with that actually ordered. This is due to the time and trouble required by the purchaser in either personally overseeing the weighing of the ice at the time of delivery or the reweighing of the ice after delivery. In the latter case it is ordinarily necessary to remove the ice from the container. Such conditions naturally encourage unscrupulous vendors in delivering less than the amount actually bargained for.

The general aim of the present invention is the provision of means whereby the consumer can tell at a glance the amount of ice actually contained in the ice receptacle.

Other more specific objects are to provide a weighing apparatus particularly adapted for use with a refrigerator or other storage receptacle; to provide a novel means for supporting the ice; and to provide a novel means for insuring a free straight line movement of the ice support irrespective of the position of the ice thereupon.

Other objects and advantages will hereinafter appear.

One embodiment of the invention is illustrated in the accompanying drawings in which:—

Figure 1 is a front elevation of a refrigerator embodying the features of the present invention.

Fig. 2 is a fragmentary vertical section taken substantially on the line 2—2 of Fig. 1 on a somewhat larger scale.

Fig. 3 is a fragmentary top plan view of the refrigerator with the top removed, showing ice receptacle therein.

Fig. 4 is a vertical section taken substantially on the line 4—4 of Fig. 3, a part of a side wall being broken away to better illustrate certain parts.

Figs. 5 and 6 are views in elevation of a certain detail showing the same in two different positions.

The refrigerator 10 may be of any standard or approved construction. That illustrated in Figs. 1 to 4 is designed primarily for household use and includes a rectangular cabinet having an ice compartment 11 arranged in an upper corner thereof, the remainder of the space being reserved for storage purposes. A vertical partition 12 divides the ice compartment from the storage compartment 13. This partition is provided with openings 14 as indicated in dotted lines in Fig. 4 adjacent the top and bottom of the ice compartment to permit a free circulation of air therethrough. Additional perforations such as indicated at 15 may be provided if desired. The bottom of the ice compartment is preferably formed by a slightly inclined partition 16 adapted to receive the drippings from the melted ice and to drain the same into the discharge pipe 17 connected therewith.

The support for the ice is movably mounted within this compartment. This support may assume various forms but in the present instance comprises a box like receptacle 18 preferably so mounted as to be spaced on all sides from the walls of the compartment. Thus the ice is well separated and insulated from the outer walls of the refrigerator. That wall 19 of the receptacle adjacent the partition 12 and the bottom 20 of the receptacle are perforated as shown at 21 so that the air passing through the partition 12 from and to the storage space 13 may come into direct contact with the ice. The perforations 21 in the bottom of the receptacle also permit the water from the melted ice to escape to the drain board or partition 16.

The ice receptacle 18 is yieldably supported so as to move under the weight of the ice contained therein a distance proportional to the weight. This may be accomplished in various ways. In the present instance however springs 22 are employed for this purpose. Each spring is connected at one end to a suitable bracket 23 secured preferably to a corner of the receptacle and at the other end to a supporting spider 24. Spider 24 is provided with four rigid arms 26 meeting at a common center 27 substantially above the center of the receptacle as shown in Fig. 3. The spider is preferably adjustably supported so that, should the springs 22 become stretched due to continued use, the spider could be raised thus returning the receptacle to its normal position relative to the compartment. In the present instance this is accomplished by means of a bolt 28 passing through the center of the spider and through a rigid beam 29. By screwing the nut 30 on the bolt the supporting spider may be vertically adjusted at will. The beam 29 preferably extends across the top of the ice compartment 11 and is fixed at opposite ends to the sills 31 forming a part of the refrigerator structure.

A support of this character permits the ice receptacle to yield under the weight of the ice but it has been found that unless the ice is positioned substantially at the center of the receptacle, the receptacle will not follow a strictly vertical movement but has a tendency to swing toward one side or another. It has further been found that ordinary straight guides do not satisfactorily correct this tendency but on the other hand act to bind the receptacle in its movements. This difficulty is fully overcome however by the use of the devices which will now be described. These devices include a suitable linkage connecting the receptacle with the compartment walls.

The linkage shown in Fig. 4 is designed to prevent lateral swinging of the receptacle. This linkage includes a pair of links 32 and 33 hingedly connected at 34. Link 32 is pivotally connected at 35 to the rear wall of the receptacle and link 33 is pivotally connected to the bottom of the compartment at 36. As the receptacle is moved up or down the links 32 and 33 swing in planes parallel to the rear wall of the receptacle. A third link 37 is hingedly connected at one end 38 to a wall of the compartment and at the other end 39 to the link 32. The lengths and relation of the links is such that as the receptacle moves up or down through its rather short range of movement, the pivot point 35 travels in a straight vertical line. This movement is clearly portrayed by the full and dotted line positions of the links in Fig. 4.

Similar combinations of levers are employed at the top and bottom portions of each side of the receptacle to prevent forward or rearward swinging of the receptacle at either side. For instance in Fig. 2 the link 40 coöperating with the links 41 and 42 prevents forward or rearward movement of the top of that side of the receptacle, while link 43 coöperating with links 44 and 45 prevents a similar movement of the bottom of that side of the receptacle.

Thus it will be seen that a support and control has been provided for the ice receptacle which will insure a strictly vertical movement of the receptacle a distance proportional to the weight of ice contained therein. By transmitting this movement to a suitable indicator the correct weight of the ice may be ascertained at a glance.

The indicator selected for this purpose includes a suitable pointer 46 and dial 47 preferably mounted within view from the outside of the refrigerator. The pointer is fixed to a spindle 48 which extends to the interior of the ice compartment and carries on its inner end an actuating pinion 49. This pinion meshes with a suitable rack 50 vertically mounted upon the ice receptacle. The pointer is thus caused to turn through an angle corresponding to the movement of the receptacle. The dial may be properly calibrated to read directly in weight units.

Various means may be provided for safeguarding the apparatus. For instance, should the springs be maintained under constant tension under the weight of the ice, they would soon become stretched and lose their resiliency thus requiring frequent replacements. Means is therefore provided for relieving the springs from load except at such time that it is desired to obtain the correct weight of the ice. In the present instance this means includes a lever 51 pivotally supported upon a bracket 52 and preferably extending through the refrigerator wall to the exterior thereof. Bracket 52 may be mounted upon any fixed support such as the beam 29. The inner end of the lever is pivotally connected to a bracket 53 secured preferably to the top of the ice receptacle substantially above the center thereof (see Figs. 3 and 4). Under normal conditions the lever 51 is fixed in the position shown in Fig. 4 in which position the weight of the ice receptacle and the ice contained therein is supported by the inner end of the lever rather than by the springs 22. When it is desired to weigh the ice however the lever is released. The springs then take the load and yield in accordance with the weight of the ice.

Various means may be provided for retaining the lever in the fixed position. In the present instance this means includes a plate 54 secured preferably to the outer wall of the refrigerator. This plate is vertically slotted at 55 to receive the free end of the lever and is also laterally kerfed to receive a latch plate 56. This latch is pivoted to the plate 54 as at 57 and is provided with a shoulder 58 for engaging the lever 51 when swung down to its latching position. It will be noted that the latch is so shaped as to close the slot 55 when in latching position. In order to facilitate the withdrawal of the latch a small screw 58' is mounted thereon and adapted to take in and project from a slot 59 in the plate.

Means is also provided for preventing the closing of the ice compartment door until the ice receptable has been so raised as to unload the springs. This means includes a pin 60 shown in Fig. 2. This pin is hingedly mounted as at 61 preferably upon the top of the ice receptacle. It normally lies in a horizontal position projecting immediately above the door opening 62 as shown. When the door 63 has been opened however and ice placed in the receptacle, the receptacle is lowered by the weight thereof and the pin lowered into such position in the door opening as to prevent closing of the door. When the receptacle is raised, the pin is again carried out of range of the door, thus permitting its closure.

The pivotal mounting of the pin however permits the lowering of the ice receptacle after the door has been closed to permit a weighing operation without requiring the opening of the door; assuming that the parts are in the position shown in Fig. 2, that the receptacle is loaded and that the door has been closed. Upon releasing the lever 51 the receptacle will be lowered and the free end of the pin will engage the upper edge of the door and swing upwardly about its pivot thus permitting continued downward movement of the receptacle a distance proportional to the weight of the ice.

Although the invention has been described in connection with a refrigerator as a means for weighing ice it is apparent that the invention may be applied to various other uses.

Various changes may be made in the embodiment of the invention hereinabove specifically described without departing from or sacrificing any of the advantages of the invention as defined in the following claims.

I claim:—

1. The combination with a container having a storage compartment of a receptacle for the goods contained therein, a rigid support for said receptacle, a spider, adjustable means connecting said spider with said support, a plurality of resilient elements connecting said receptacle with said spider, and means for indicating the extent of movement of said receptacle under the weight of the goods contained therein.

2. The combination with a container having a storage compartment of a receptacle for the goods contained therein, yieldable means for supporting said receptacle within said compartment and permitting movement of said receptacle under the weight of the goods, means for permitting and insuring only a free vertical movement of said receptacle, said last named means including a set of levers for preventing horizontal movement of said receptacle in one direction and a set of levers for preventing horizontal movement in another direction, and means for indicating the extent of such vertical movement.

3. In a weighing apparatus the combination of a receptacle for the goods to be weighed, means for yieldably supporting said receptacle, linkage means for permitting and insuring only a free vertical movement of said receptacle under the weight of the goods, said linkage means including a set of levers for preventing horizontal movement of said receptacle in one direction and a set of levers for preventing horizontal movement in another direction, and means for indicating the extent of such vertical movement.

4. In combination a compartment, a goods receiving support suspended from the top of said compartment and movable under the weight of the goods contained therein, linkage means for permitting and insuring only a free vertical movement of said support, said linkage means including a set of levers for preventing horizontal movement of said receptacle in one direction and a set of levers for preventing horizontal movement in another direction, and means for measuring the extent of such vertical movement.

5. The combination with a container having a storage compartment and a goods carrying support yieldably mounted therein, of linkage mechanism for insuring a free, straight line, vertical movement of said support, said mechanism including a pair of pivotally connected levers connected with said compartment and said support respectively, and a third lever for controlling the movement of said pair of levers, and means for indicating the extent of vertical movement of said support.

6. The combination with a container having a storage compartment of a support for the goods contained therein, spring means for yieldably supporting said support but permitting movement thereof under the weight of the goods, means for measuring the extent of such movement, and a lever extending outside of said container operable to lift and hold said support in its normal upper position independently of said spring means.

7. The combination with a container having a storage compartment of a support for the goods contained therein and movable under the weight of the goods, means for measuring such movement and a lever extending outside of said compartment for releasably retaining said support in its normal upper position.

8. The combination with a container having a storage compartment provided with a slot through one wall thereof of a support for the goods contained therein and movable under the weight of the goods, means for measuring such movement, a lever extending through said slot for lifting said support to its upper position, and a latch element movable over said slot for retaining said lever in such position.

9. The combination with a container having a storage compartment and a door therefor, of a support for the goods contained in said compartment and movable under the weight of the goods thereon, means for controlling the movement of said support, and means for preventing the closure of said door except when said support is in its raised position.

10. The combination with a container having a storage compartment and a door therefor, of a support for the goods contained in said compartment and movable under the weight of the goods, means outside of said compartment of controlling the movement of said support and a member for preventing the closure of said door except when said support is in its raised position but permitting movement of said support when said door is closed.

In witness whereof I hereunto subscribe my name this 24th day of September, 1919.

HANS BERNHARDT.